(12) United States Patent
Benson et al.

(10) Patent No.: US 6,871,203 B1
(45) Date of Patent: Mar. 22, 2005

(54) DATA PROCESSING SYSTEM

(75) Inventors: Donald Edward Benson, Erie, PA (US); Philip Lester Flowers, Morgan Hill, CA (US); Chris Myunghoon Lee, Fremont, CA (US); Thomas S. Lee, San Jose, CA (US); Mayank V. Shah, San Jose, CA (US); Shirley S. Wang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 09/692,915

(22) Filed: Oct. 20, 2000

Related U.S. Application Data

(60) Provisional application No. 60/162,700, filed on Oct. 29, 1999.

(51) Int. Cl.$^7$ .............................................. G06F 17/30
(52) U.S. Cl. .............................. 707/10; 707/1; 707/101
(58) Field of Search ....................... 707/1–10, 100–102, 707/200–206

(56) References Cited

U.S. PATENT DOCUMENTS

| | | | | |
|---|---|---|---|---|
| 5,535,386 A | * | 7/1996 | Wang | 707/203 |
| 5,581,760 A | | 12/1996 | Atkinson et al. | |
| 5,608,900 A | | 3/1997 | Dockter et al. | |
| 5,649,185 A | * | 7/1997 | Antognini et al. | 707/9 |
| 5,802,524 A | * | 9/1998 | Flowers et al. | 707/103 R |
| 5,809,232 A | * | 9/1998 | Johnson et al. | 709/206 |
| 5,857,203 A | * | 1/1999 | Kauffman et al. | 707/200 |
| 6,135,646 A | * | 10/2000 | Kahn et al. | 709/217 |

OTHER PUBLICATIONS

Crawley et al., Middleware '98, IFIP Int. Conf. On Dist. Sys. Platforms and Open Distributed Processing, pp. 291–304, 1998.

Seshake, H. et al., Data communication platform in distributed operations system based on TMN, NOMS 96. 1996 IEEE Network Operations and Management Symposium (Cat. No. 96CH35757), Pt. vol. 2, pp. 349–359 vol. 2, Published: New York, NY, USA, 1996, 4 vol. (xvii+754+56) pp. Abstract.

* cited by examiner

*Primary Examiner*—Jean M. Corrielus
*Assistant Examiner*—Joon Hwan Hwang
(74) *Attorney, Agent, or Firm*—Gates & Cooper LLP

(57) ABSTRACT

A technique for manipulating objects at a computer is described. The technique includes receiving one or more requests to manipulate an object, wherein each request is received from a different thread. Each request to manipulate an object generates a copy of the object and a unique identifier for each copy of the object. A request to manipulate a copy of an object is distinguished from other requests to manipulate other copies of the object using the unique identifier.

Additionally, a technique for accessing objects at a computer is described. The technique includes receiving a request from a client process for an object which is stored in an object server. A library server process is allocated to handle the object request. Transfer of the requested object is initiated. Thereafter, the library server process that was allocated to the object request is released.

57 Claims, 9 Drawing Sheets

DATA PROCESSING SYSTEM

PROVISIONAL APPLICATION

This application claims the benefit of U.S. Provisional Application No. 60/162,700, entitled "DATA PROCESSING SYSTEM," filed on Oct. 29, 1999, by Donald E. Benson et al., which is incorporated by reference herein.

BACKGROUND OF THE INVENTION

1. Field of the Invention

This invention relates in general to database management systems performed by computers, and, in particular, to processing objects.

2. Description of Related Art

For nearly half a century, computers have been used extensively by businesses to manage information such as numbers and text, mainly in the form of structured, digital coded data. For example, digital data has been used with airline ticket reservations, bank deposits, insurance claims, and credit card transactions. The average size of business data in digital form is relatively small. For example, a banking record including a customer's name, address, phone number, account number, balance, etc. represents approximately a few hundred characters or a few hundreds or thousands of bits.

Business data, however, represents only a small part of the world's information. With advances in storage, communication, and information processing technologies, other forms of digital data including images, audio, and video have been combined with traditional text and numeric information to form new types of information—multimedia information. Multimedia information is different from general business data since it cannot be fully pre-structured (its use is not fully predictable), and because it is the result of the creation of a human being or the digitization of an object of the real world (e.g., x-rays, geophysical mapping, etc.) rather than a computer algorithm. In addition, the average size of multimedia information may be significantly larger than digital business data.

Numerous applications utilize libraries of digitized data, i.e., digital libraries. For example, digital works are widely used with the Internet, tweening (i.e., identifying animation objects and defining their movements), WebTV, Synchronized Multimedia Integration Language (SMIL) (enabling Web developers to divide multimedia content into separate streams, send them to a user, and have the streams appear as a single multimedia stream), and other network applications based on Transmission Control Protocol/Internet Protocol (TCP/IP) communications and similar communications protocols. As these technologies advance and their costs come down, it becomes more feasible to digitize other types of data, store large volumes of it, and be able to distribute it on demand to users at their place of business or home. However, the speed at which multimedia applications execute may be limited by having to manipulate copies of the same object called for by the applications in sequential order.

At any one time, access to an object in a multimedia database may be limited to a single client or a single workflow application or process. This is true even though the application may need multiple copies of the same object (e.g., copies for memory, for file in a data store, and for application). This sequential processing scheme is the result of a number of fundamental processing limitations.

When multiple copies of an object are being downloaded simultaneously to a single receiving system over a network or other data line, the receiving system may not be able to distinguish between the multiple copies of the same object. For example, User A requests an object and downloads Copy 1 of the object. User B simultaneously requests that same object and receives Copy 2 of the object. Copy 1 and Copy 2 may be downloaded such that a portion of Copy 1 is transmitted over the network, then a portion of Copy 2 is transmitted, etc. Therefore, it is necessary to be able to distinguish between copies of the same object.

A second limitation is that an application program can not distinguish a copy of an object from the original object. For example, User A may download a copy of an object from memory, modify that copy, and upload the copy to back to memory, which also stores the original object. User B may then request a copy of the original object. User B, however, can not distinguish a copy of the object from the original object, and thus, User B may retrieve either the original object or the copy modified by User A. Consequently, User B may download the copy of the object modified by User A instead of downloading the original object. Thus, it is necessary to be able to distinguish between an object and a copy of an object.

A third limitation is that an application may have multiple application threads (i.e., units of work within an application), and each application thread may request different copies of an object, but these retrieve requests cannot be distinguished in conventional systems. Thus, the application can not track which threads have processed particular copies of an object. Even if the application knows that one of the object copies has downloaded, the application will not know which thread the copy is for. Thus, since applications can not track the copies, they can not track when threads have finished manipulating particular copies of objects.

In conventional systems, users and applications receive and process objects sequentially. Consequently, users experience processing delays with the sequential processing system. This problem is amplified when users execute multithreading applications or applications that are required to manipulate large objects and/or numerous objects. For example, the Internet may produce thousands or tens of thousands of copies of the same object. In addition programs utilizing multiple copies of a single object are more complicated since programmers must be careful to design the program such that all the threads run without interfering with each other. As a result, programs are slower, create unnecessary user inconvenience, and more expensive since programmers must expend extra time and effort to overcome these shortcomings.

Therefore, there is a need in the art to uniquely identify each request to retrieve or store an object to enable multiple users to simultaneously manipulate copies of the same object.

In addition, conventional system process requests for objects by allocating a child process of a library server to process the request such that library server loses control over the child process while the object request is being retrieved. As a result, the child process can not be allocated to another object request until the object has been completely transferred from the object server. More specifically, the request for an object comes from a client server to the daemon process associated with the client server. The request is then transferred from the daemon process to the library server. Then, the request is transferred from the library server to the object server. The object server begins to transfer the object to the client computer via the daemon. After the entire object has been transferred to the client computer, the daemon process notifies the object server that the transfer is complete. The object server then notifies the library server which in turn notifies the daemon process that the transfer is complete. Finally, control of the child process that was allocated to the object request is restored to the library server such that the child process may serve other client requests.

Conventional object retrieval systems have a number of shortcomings. The child process can not handle subsequent tasks until the first transfer is completed and the object server releases the child process of the library server. Only then can the child process be allocated to handle a second object request. Furthermore, a user does not regain control over the object transfer until the object has been transferred and the child process is released. Consequently, each child process processes requests in a synchronous manner in the order in which they are received. As a result, the child process is allocated and idle while the object is being transferred. Moreover, the abilities of a user are restricted until the object is transferred and the child process is released. Thus, conventional systems do not utilize resources in an efficient manner resulting in diminished throughput, performance, and user interaction and control. These shortcomings are further amplified if large objects or a large number of objects are requested since the a child process will be allocated and idle for a longer period time to process these requests.

Accordingly, there is a need in the art to release process resources before a time when an object has been completely transferred such that process resources may be allocated to different tasks during the object transfer and such that a user may perform more tasks during the object transfer.

SUMMARY OF THE INVENTION

To overcome the limitations in the prior art described above, and to overcome other limitations that will become apparent upon reading and understanding the present specification, the invention discloses a method, apparatus, and article of manufacture for uniquely identifying requests to retrieve or store an object.

According to one embodiment of the invention, one or more requests are received to manipulate an object. Each request is received from a different thread. For each object request, a copy of the object is generated and a unique identifier is associated with the request and the object copy. Requests to manipulate copies of the same object are distinguished using the unique identifier.

According to another embodiment of the present invention, a request for an object stored in an object server is received from a client process. A library server process is allocated to the object request. Under control of the library server process, transfer of the requested object from the object server is initiated. After initiating the transfer, the library server process is released.

BRIEF DESCRIPTION OF THE DRAWINGS

Referring now to the drawings in which like reference numbers represent corresponding parts throughout.

DETAILED DESCRIPTION

In the following description of embodiments of the invention, reference is made to the accompanying drawings which form a part hereof, and in which is shown by way of illustration specific embodiments in which the invention may be practiced. It is to be understood that other embodiments may be utilized and structural and functional changes may be made without departing from the scope of the present invention.

Overview

This invention addresses multiple requests to manipulate (i.e., store or retrieve) an object. In particular, each request to store or retrieve an object is assigned a unique identifier. This enables distinguishing object copies from each other and distinguishing object copies from the original object.

The unique identifier is an element handle. An element handle refers to a memory address allocated to each individual storage or retrieval request submitted by threads of an application process. A process is an executing program, and a thread is a unit of work of the process. A user submits the request to manipulate an object to a client computer. The client computer generates the element handle. The client computer transfers the element handle to a library server. The library server locates which one of a plurality of object servers stores or will store the object and selects that object server. The library server passes the element handle to the selected object server. The object server receives the element handle and communicates with the client computer to execute the user's request. This triangular communication system among the client, library, and object servers ensures that all servers have the element handle. With the element handle, each server knows the source of every request for an object. In addition, each server knows which request corresponds to a particular object or copy of an object. Thus, when an object is requested by multiple threads, each thread may simultaneously execute with copies of the same object based on the unique identifier.

The present invention also addresses retrieving objects from object servers asynchronously such that a child process of a library server is released after the object transfer is initiated. In particular, instead of waiting until a whole object has been transferred until a child process of a corresponding library server is released, the child process is released before the object transfer has been completed to enable the child process to attend to other tasks.

Hardware Environment

Figure 1A:
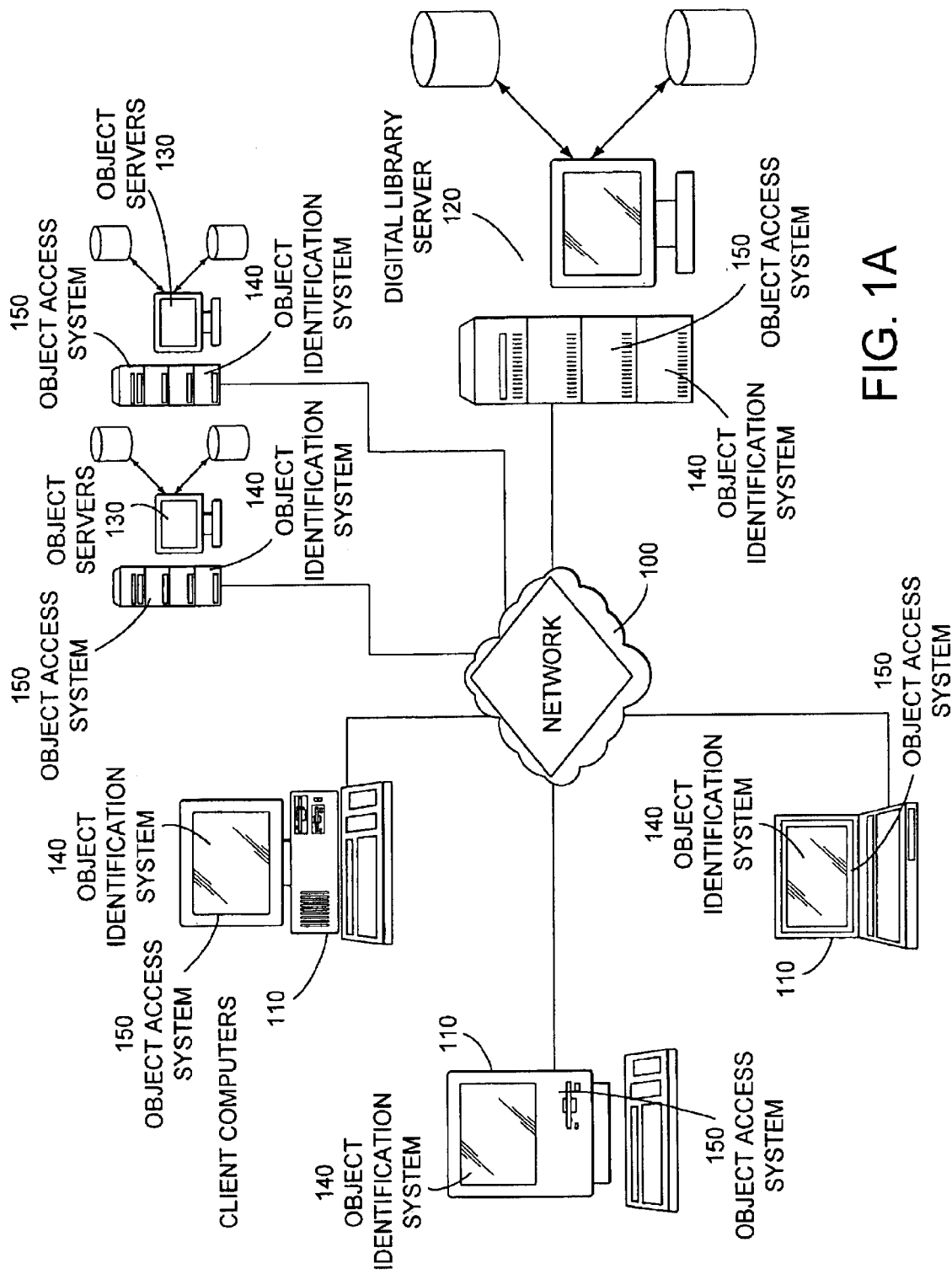
FIGS. 1(A–C) schematically illustrate the hardware environment of a preferred embodiment of the present invention and more particularly, illustrates a typical network system with a digital library server.

FIGS. 1(A–C) schematically illustrate a preferred embodiment of the hardware environment that may be used with the present invention. More particularly, FIG. 1A illustrates a typical distributed computer system in which a user utilizes a network 100 to connect client computers 110. The client computers 110 execute applications utilizing a digital library server 120 and related object servers 130. A typical combination of resources may include client computers 110 that are personal computers or workstations, and a library server 120 that is a personal computer, workstation, minicomputer, or mainframe. An object server 130 may comprise, for example, a multimedia database. These systems are coupled to one another by various networks 100, including LANs, WANs, SNA networks, and the Internet.

A client computer or server 110 typically executes a client application and is coupled to a library computer or server 120 executing server software. The client application is typically a software program such as a workflow application. The server software is typically a program such as IBM's Digital Library or Visual Info server software. The library server 120 also uses a data source interface and, possibly, other computer programs, for connecting to the object servers 130. The client computer 110 is bidirectionally coupled with both the library server computer 120 and the object servers 130 over a line or via a wireless system. In turn, the library server computer 120 is also bidirectionally coupled with the object servers 130.

The object server 130 interface may be connected to a Database Management System (DBMS), which supports access to an object server 130 by executing Relational Database Management System (RDBMS) software. The interface and DBMS may be located on the same server as the library server computer 120 or may be located on a separate machine. In addition, the object servers 130 may be geographically distributed. Programs, including an object identification system 140 and the object retrieval system 150 may be resident and execute within the client computer 110, library server 120, and object servers 130. The object identification system 140 and the object retrieval system 150 manage the activities of each server and manages the communications between servers.

Both the object identification system 140 and object access system 150 request that the client computer 110, library server 120, and object servers 130 perform specific tasks to execute each request to manipulate an object. When the following sections refer to a server performing a certain task, these actions are considered to be initiated and managed by the object identification system 140 or object access system 150 resident on each server involved in completing the task. However, in order to provide a detailed explanation of the present invention, the specification will refer to the actual component (e.g., client computer 110, library server 120, and object server 130) as performing a specific manipulation or retrieval task rather than the object identification system 140 or object access system 150 even though these systems may coordinate the activities of each component.

Those skilled in the art will recognize that the exemplary environment illustrate in FIG. 1A is not intended to limit the present invention. Indeed, those skilled in the art will recognize that other alternative system environments may be used without departing from the scope of the present invention.

Figure 1B:
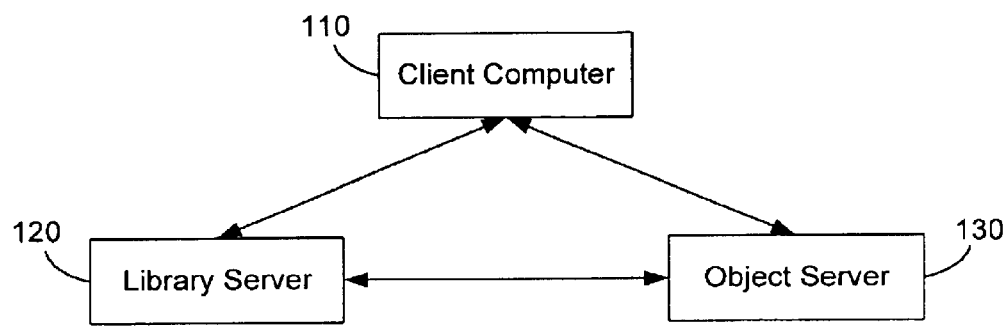
Figure 1C:
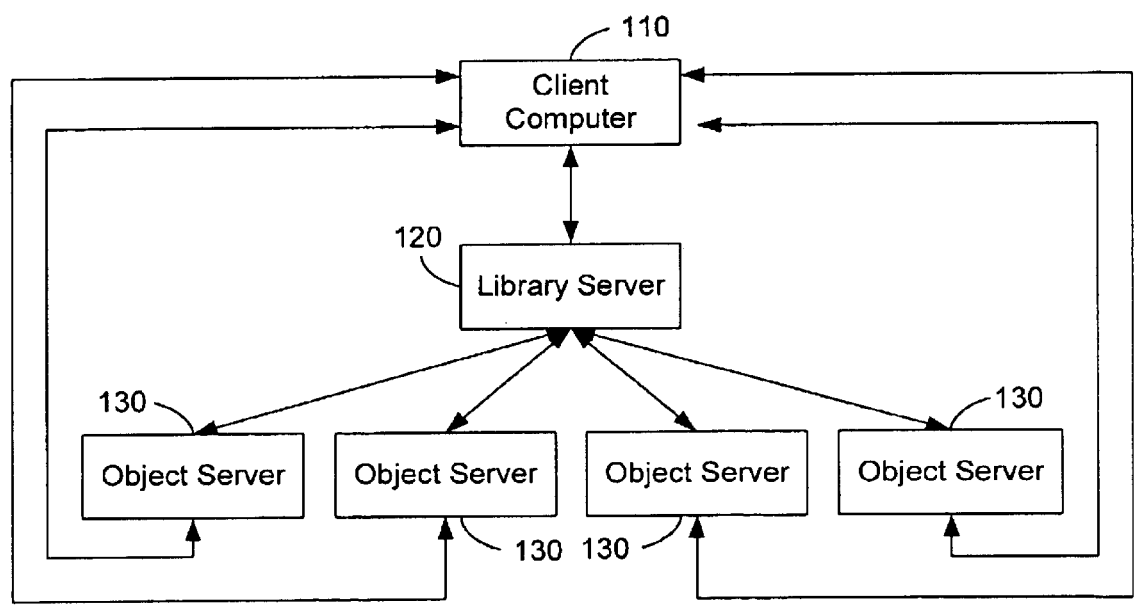

FIGS. 1B and 1C, block diagrams illustrating the communications among the servers and computers, illustrate a client computer 110, a library server 120, and one or more plurality of object servers 130 utilized by the object identification system 140 and object access system 150. A user communicates with the client computer 110 and submits a request to the client computer 110 to manipulate (i.e., to store or retrieve) a particular object. The request may be generated by the user, through an application program interface (API) resident on the client computer 110, by clicking an icon which launches an application. In order to retrieve an object . . . In order for the application program to execute, the application process may need to execute various process threads. Each thread may have to manipulate an object, possible the retrieved object or possibly the same object as other threads. The client computer 110 generates a unique identifier for each element or set of data generated for each request to enable each thread to simultaneously execute, even if those threads request the same object.

Multiple, Concurrent Store/Retrieve of Same Objects

Figure 2:
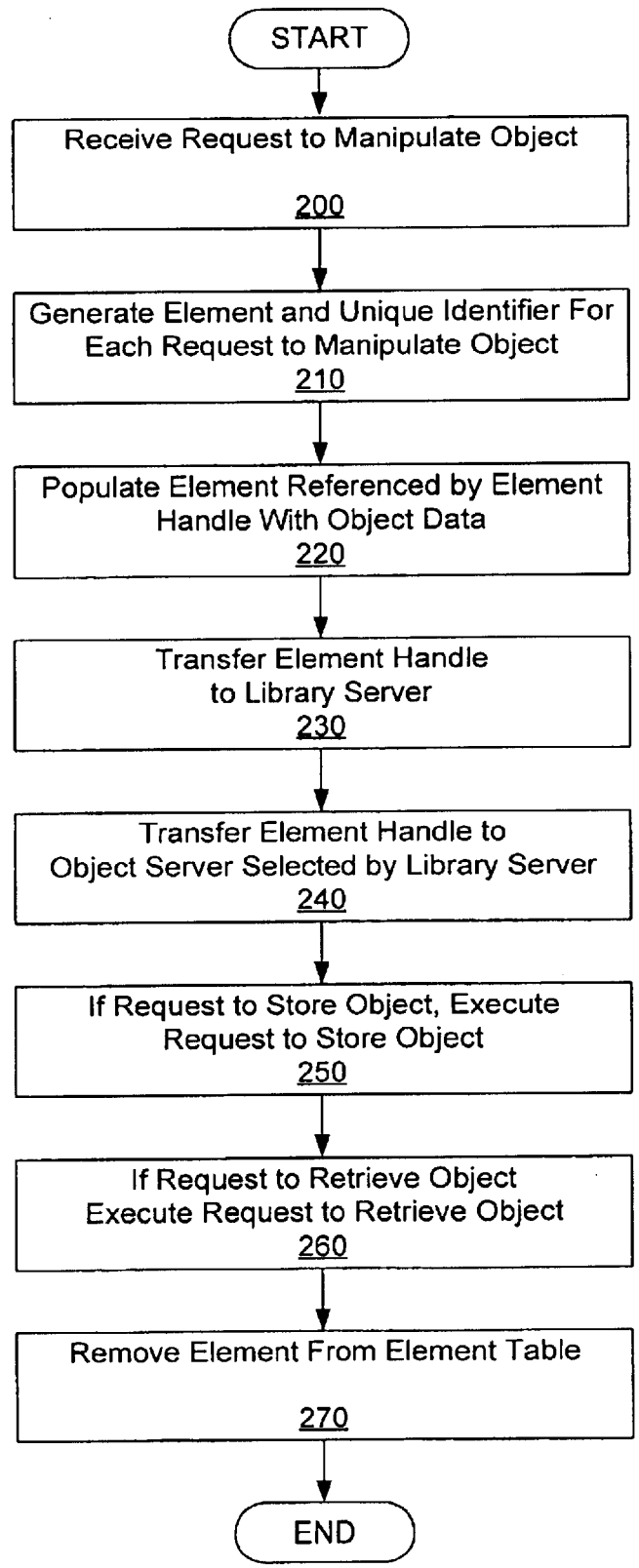
FIG. 2 is a block diagram illustrating a memory configuration of a client computer and a daemon process utilized by the object identification system.

FIG. 2, a flow diagram of the technique utilized by the object identification system 140, generally illustrates how requests to store or retrieve objects are assigned unique identifiers and how those requests are executed utilizing a client computer 110, library server 120, and data stores or object servers 130. Initially, in block 200, the object identification system 140 receives a request to manipulate an object. Then, in block 210, the object identification system 140 generates a unique identifier or element handle. The object identification system 140 populates an element referenced by the element handle with related object data in block 220. In block 230, the object identification system 140 transfers the element handle to a library server 120. The object identification system 140 then transfers the element handle to an object server 130 selected by the library server 120 in block 240. In block 250, if the user request is to store an object, then the object identification system 140 executes the request to store an object. After storing the object, in block 260, the object identification system 140 updates the library server 120 to reflect changes in the object servers 130. If the user request is to retrieve an object, the object identification system 140 executes the request to retrieve an object. Then, in block 270, the object identification system 140 may remove the element from the element table after the user finishes manipulating the object (e.g., opening the object, viewing it, and closing it). Following is a more detailed description of the present invention.

1. Receiving Request to Manipulate Object

The user submits and the client computer 110 receives a request to manipulate an object.

2. Generating Unique Identifier for Each Request to Manipulate Object

After a request to manipulate an object is received by the client computer 110, the client computer 110 generates a unique identifier for each request to manipulate an object.

2.A. Client Computer and Element Handle Characteristics

FIG. 2 is a block diagram illustrating one possible configuration of the client computer 110 utilized by the object identification system 140. Typically, there is a single client computer 110. However, those skilled in the art will recognize that various client computer 110 configurations, including multiple client computers 110 with appropriate communications, may also be utilized. The client computer 110 acts as the user interface to utilize the triangular communications system.

The client computer 110 may be configured such that a portion of memory 300 is allocated to store one or more elements 310. These elements 310 may form an element table 320 (i.e., a row of the element table 320 corresponds to an element 310). Each element 310 occupies a specific block of memory 300. An element handle 330 refers to the memory address allocated to each element 310. As a default, the element table 320 may be configured to store one hundred elements 310. Thus, one hundred element handles 330 or memory addresses are required to refer to one hundred elements 310. The number of elements 310 that may be stored within an element table 320 is limited by the available client computer memory 300 and/or memory allocated to the element table 320. If more than one hundred elements 310 are required, the user can configure the client computer 110 to allocate additional memory 300 to the element table 320, if available, to accommodate additional elements 310.

Further, each element 310 is populated by related object data 340. In addition, the client computer 110 includes a daemon process 350. The daemon process 350 manages the requests submitted by the user and acts as an interface between the client computer 110, library server 120, and object server 130. In addition, the client computer 110 includes a file system 360 to which objects may be retrieved from an object server 130.

The unique identifier for all requests, whether the request is to store an object or to retrieve an object, is the element handle 330, which refers to the memory address of the element 310, generated for each request. Thus, each request is assigned a unique element handle 330 since an element 310 is generated for each request, and each element 310 is referenced by a specific memory address. Thus, the element handle 330 serves as a pointer to each element 310 within the element table 320. For example, if a user submits a request to store an object, the memory address allocated to the element 310 generated for that store request is the element handle 330. Similarly, when a user submits a request to retrieve an object, the memory address of the element 310 generated for that retrieve request is the element handle 330. Thus, an element handle 330 is assigned to individual requests rather than individual users or applications. Each user or application may submit multiple requests, and each request is assigned a unique element handle 330 which refers to the memory address allocated to the element 310 and related object data 340.

Having the ability to uniquely identify each request to store or retrieve an object allows application programs to distinguish copies of objects from each other and to distinguish a copy of an object from the original object. Multiple tasks involving the same object may be executed simultaneously or in parallel rather than in serial or sequential order. In other words, each process thread can manipulate an object without waiting for the previous thread to execute, and therefore, the application process will be executed in less time. Distinguishing requests to manipulate larger multimedia objects is even more advantageous. Multimedia objects require significantly more time to process compared to traditional digital text and numerical data since they are much larger than text and numerical objects. Therefore, identifying each request to manipulate an object with an element handle 330 increases efficiency.

2.B. Structure of Elements, Element Handles, and Element Table Memory

Each element 310 of the element table 320 may be populated by object data 340. For clarity, the specification and figures will refer to storing data to an element 310 as "populating" an element 310 with object data 340, whereas storing an object from memory or from a file to an object server will be referred to as "storing" an object.

An element 310 may be populated with object data 340 that assumes different data structures. In one embodiment of the present invention, object data 340 may be defined as the following structure:

```
typedef struct
{
    POPENLIST      pOpenList;        // pointer to open list node
    STORETYPE      StoreType;        // storage type (e.g.,
                                     memory or file)
    PVOID          pStorage;         // pointer to memory or to
                                     filename
    ULONG          ulLength;         // element length
    ELEMKEY        szKey;            // element key
    ULONG          ulLengthCurrent;  // current length
    ...
} CLNTOPENELEM;
```

The pOpenList data field is a pointer that refers to an open list node or to a list of other pointers. An open list node is a set of general, persistent data about the environment, which is maintained regardless of element 310 additions, deletions, and modifications.

The StoreType data field is used with both a request to store an object and a request to retrieve an object. In the case of a request to store an object, the daemon process 350 uses StoreType to determine the origin of an object. In other words, the daemon process 350 uses StoreType to determine whether the object stored from a file or memory. In the case of a request to retrieve an object, the daemon process 350 uses StoreType to determine the future location of an object. In other words, the daemon process 350 determines whether an object is retrieved to a file or to memory. In both requests to store an object and requests to retrieve an object, StoreType indicates that the object is to be stored from or retrieved to memory if there is no resident memory to store an object.

The pStorage data field is a pointer to the name of the file or a pointer to a memory address identifying the object, depending on whether store type is file or memory.

The data field ulLength refers to the actual length of the object.

The field szKey is an element key that identifies elements 310 based on particular features or attributes. For example, szKey may refer to an item identification, part number, and rep type. These three identification attributes are explained in further detail in section 3.

The field ulLengthCurrent is another status field that indicates what portion of an object has been retrieved. Typically, this field is useful when retrieving very large objects. The field ulLengthCurrent may change depending on what portion of the object has been retrieved. The field ulLengthCurrent will be the same as ulLength after an object has been retrieved.

Furthermore, the ellipses in the structure indicate that other fields may be included.

Thus, while the previously described data fields may be used to generate elements 310, other alternative embodiments of the present invention may utilize one or more or all of the previously described data fields. Further, additional alternative embodiments may utilize one or more of the following data fields (e.g., lRetention, pDescription, ulDescLength, bIsLibraryClientHandle, pEvent, TimeAvailable, bAsync, bAbort, ulLengthTarget, tid, ulExtRC, etc.) to generate object data 340 to populate elements 310. Those skilled in the art will recognize that other data fields may likewise be utilized to generate object data 340.

In one embodiment of the present invention, the following is a sample element table 320 containing elements 310:

Element Table

|  | pOpenList | StoreType | pStorage | ulLength | szKey | ulLength Current |
|---|---|---|---|---|---|---|
| Element Handle 1 => | Element 1 | pOpenList 1 | StoreType 1 | pStorage 1 | ulLength 1 | szKey 1 | ulLength Current 1 |
| Element Handle 2 => | Element 2 | pOpenList 2 | StoreType 2 | pStorage 2 | ulLength 2 | szKey 2 | ulLength Current 2 |
| ... | ... | ... | ... | ... | ... | ... | ... |
| Element Handle n => | Element n | pOpenList n | StoreType n | pStorage n | ulLength n | szKey n | ulLength Current n |

Each individual element 310 maybe illustrated as a row of object data 340. Each data field of the object data 340 may be represented as a column. For example, element 1 may be populated with pOpenList, StoreType 1, pStorage 1, etc. and element 2 may be populated with pOpenList, StoreType 2, pStorage 2, etc. Each element 310 and the related object data 340 generated for each request to store or retrieve an object is stored in a specific block of memory 300. The location of each block of memory 300 storing the element 310 and related object data 340 is designated with a particular memory address, i.e, the element handle 330. Thus, the element handle 330 uniquely identifies and points to each element 310 (i.e., each row of object data 340) generated for each request to manipulate an object.

3. Populating Elements with Object Data

The element handle 330 points to an element 310 populated with object data 340 describing or identifying the object. For example, as previously described in section 2.B., the szKey data field may provide identification data.

Figure 4:
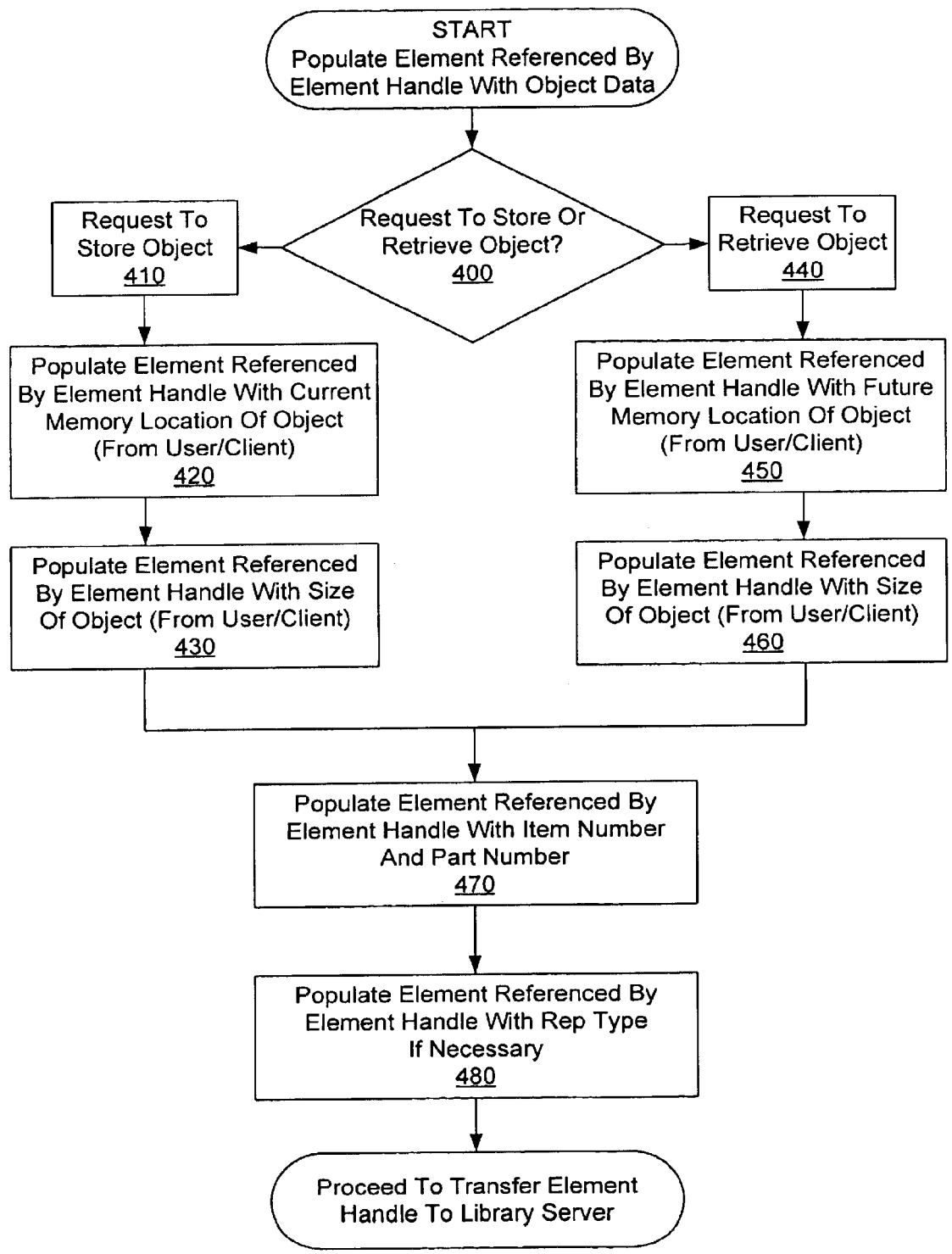
FIG. 4 is a flow diagram illustrating the steps performed by the object identification system to populate elements which are referenced by element handles with object data.

With reference to FIG. 4, the object data 340 and the source of the object data 340, may depend on whether the request is to store an object or to retrieve an object (block 400). In a request to store an object, the object identification system 140 proceeds to block 410. Otherwise, the object retrieval system proceeds to block 440.

In block 410, the object identification system 140 is handling a request to store an object. Continuing with block 420, the element 310 referenced by element handle 330 is populated with the current or original memory address of the object within the client computer 110. In other words, the element handle 330 refers to object data 340 indicating the location within a client computer 110 from which the object will be transferred. Since the object is resident in memory 300, this data may be provided by a user or a client computer 110 configured to provide this data.

In addition, an element 310 may be populated with object data 340 indicating the size of an object in block 430. When the request is to store an object, a user already possesses the object which may be resident on a client computer 110. Thus, the user may be able to determine the size of an object, and this data may be entered into an object data field of an element 310. Alternatively, the size data may be generated by the client computer 110 if the client computer 110 is configured to read the object, determine the size of the object, and populate an element 310 with size data. Thus, in a request to store an object, size data may be supplied by a user or a client computer 110.

In block 440, the request is to retrieve an object. Continuing with block 450, the element 310 referenced by element handle 330 is populated with the future location with the client computer 110 of the object. In other words, the location data indicates memory 300 within the client computer 110 which will store the retrieved object. Since this memory address is accessible to the user and the client computer 110, this data may also provided by the user or the client computer 110.

Continuing with block 450, the element 310 referenced by the element handle 330 is populated with size data relating to the object. When a user wants to retrieve an object, the object is stored in an object server 130 rather than in resident memory of the client computer 110. Thus, neither the user nor the client computer 110 has access to data indicating the size of the object to be retrieved. The user or client computer 110 may determine that the object resides in a particular object server 130 if there is only one object server 130. However, the user or client computer 110 may not know the memory address of the requested object within that object server 130. Further, if there are multiple object servers 130, the user or client computer 110 may not know which object server 130 stores the requested object, much less the memory address of the object within a server 130. Thus, the user and/or client computer 110 may not be able to determine the size of an object which is to be retrieved. Consequently, object size data is transferred from the object server 130 to the client computer 110 by referring to the element handle 330 and related object data 340. A more detailed description of this process is provided in section 6.B.

In block 470, in cases involving both a request to store an object and to retrieve an object, element 310 may also be populated with identification data. Typically, in block 470, an object is identified by a character string representing an item number and a part number. If necessary, in block 480, the character string may also include a rep type attribute. These three fields makeup a unique key for objects stored in the object server.

The item number represents or identifies the object itself. The part number represents components or pieces of the object as compared to the whole object. The rep type, however, does not represent an object or a component of an object. Rather, the rep type describes the nature of the object or an object component. To describe the identification attributes with an analogy, an "item number" may represent a document or a report, a "part number" may represent portions of that document such as a paragraph or an illustration, and the "rep type" may describe the nature of an item or part as text or an image.

The primary identification attributes of an object are the item number and part number. For example, if two objects are different objects if they are identified with different item numbers or part numbers. If two objects are assigned the same item number and part number, then these two objects may still be differentiated by the rep type attribute even though the rep type describes or labels portions of an object. Consequently, if an object is stored with the rep type attribute, the request to retrieve that object must also indicate the rep type to distinguish two objects with the same item number and part number. However, if an object is stored without the rep type attribute, a placeholder is assigned to the rep type variable. A placeholder indicates that no rep type was designated. In this case, it is not necessary to designate the rep type when a request to retrieve that object is submitted by a user.

4. Transfer Element Handle to Library Server

Continuing with FIG. 2, having discussed the configuration of the system utilized by the object identification system 140, the object identification system 140 transfers the element handle 330 to a library server 120 in block 230. More specifically, the element handle 330 is transferred from the client computer 110 to the library server 120 by the daemon process 350 after the element 310 is populated with object data 340. The daemon process 350 performs the administrative task of managing the memory queue of the client computer 110. After an element 310 is generated, the element handle 330 is transferred into a memory queue of the client computer 110. The daemon process 350 periodically scans the memory queue of the client computer 110. When a new element handle 330 has been placed in the queue indicating that a user has requested to manipulate or store an object, the daemon process 350 forwards the element handle 330 to the library server 120. Upon receiving the element handle 330, the library server 120 may also check the object data fields populating the element 310 for errors and inconsistencies before the library server 120 selects an object server 130 and transfers the element 310 to the selected object server 130. The object identification system 140 then continues to block 240.

In block 240, the element handle 330 is transferred to the object server 130 selected by the library server 120. The manner in which the element handle 330 is transferred with respect to requests to store (block 250) and requests to retrieve (block 260) objects will be explained in further detail below with reference to FIGS. 5 and 6.

5. Executing Request to Store Object

Figure 5:
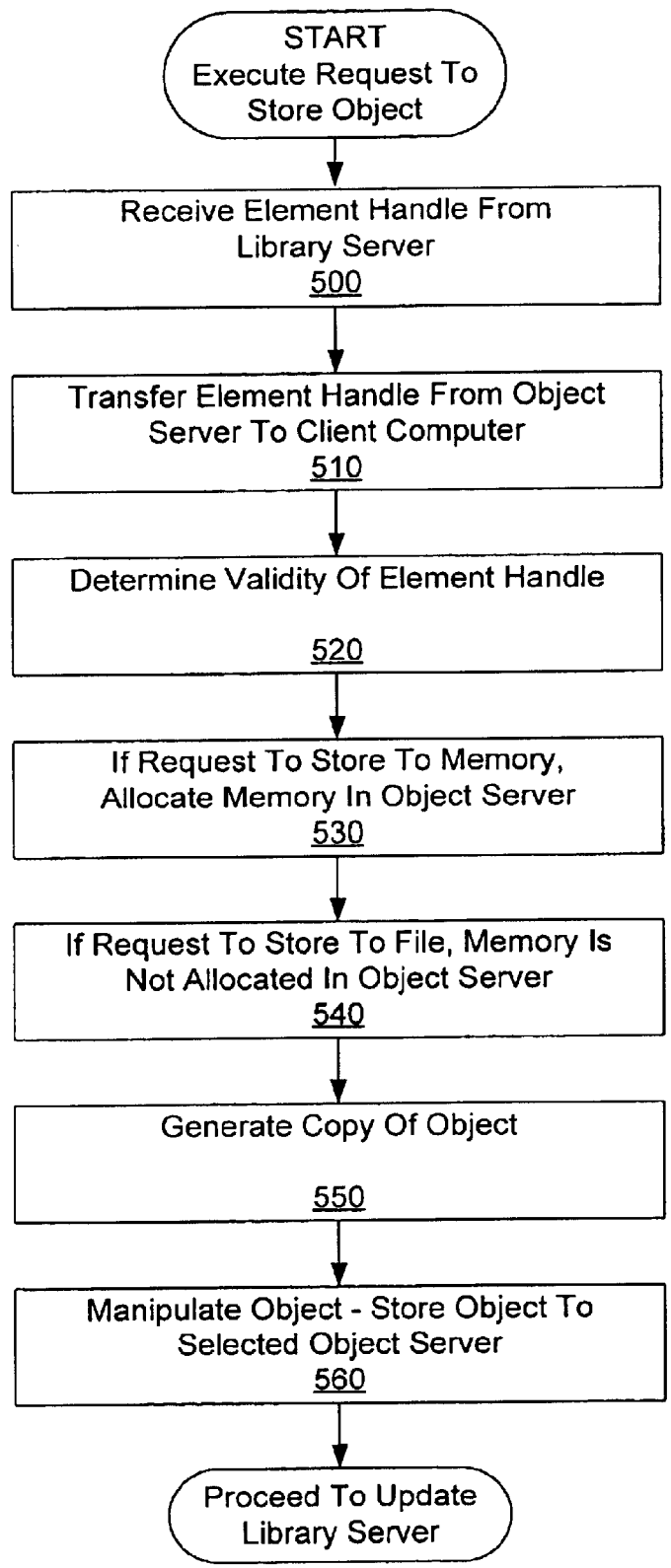
FIG. 5 is a flow diagram illustrating the steps performed by the object identification system to store an object in an object server.

FIG. 5 is a flow diagram illustrating how the object identification system 140 executes a request to store an object in an object server 130.

In block 500, the child process of the selected object server 130 receives the element handle 330 from the library server 120. In one embodiment in a request to store an object, in order to select an object server 130, the library server 120 consults a directory of the contents of each object server 130 (i.e., a catalogue) to determine which object server 130 has room to store the object and selects this object server 130. Then, the library server 120 transfers the element handle 330 to the selected object server 130. The object server catalogue may be resident in the library server 120 and may be updated to reflect additions, deletions, and modifications of objects within an object server 130.

In an alternative embodiment, the library server 120 determines whether any object server 130 already stores the particular object and processes the store request only if the object to be stored is different from the object already in the data store. Based on a review of the catalogue, if the object server 130 does not currently store the requested object, the library server 120 then determines whether that object server 130 contains sufficient memory to store the object. If sufficient memory may be allocated, the library server 120 may select that object server 130 and transfer the element handle 330 to the selected object server 130. However, if an object server 130 already stores the requested object, the library server 120 may transmit a message to the user and/or client computer 110 indicating that the request to store the object is not necessary since the object server 130 already contains the object. Further, if no object server 130 contains sufficient memory, the library server 120 may transmit a message to the client computer 110 and/or user indicating that there is insufficient memory to store this object.

The following alternative embodiments illustrate various other techniques to ascertain the contents of each object server 130 to determine which object server 130 will be selected by the library server 120. In an alternative embodiment, the library server 120 may periodically scan each object server 130 and update the object server directory to reflect any changes. In yet another alternative embodiment, the user may update the object server directory stored on the library server 120 after the user's request to manipulate an object has been completed. It is apparent to one of ordinary skill in the art that numerous techniques may be implemented to provide the library server 120 with current data regarding which objects reside in particular object servers 130.

In block 510, after the object server 130 receives the element handle 330, the element handle 330 is transferred from the selected object server 130 to the client computer 110.

In block 520, the daemon process 350 checks the element handle 330 to determine whether the element handle 330 is valid and corresponds to the correct object. After receiving the element handle 330 from the library server 120, the object server 130 has established communications with the client computer 110 and identified itself to the client computer 110 as the object server 130 that will store the object. If after checking the element handle 330 the daemon process 350 determines that the element handle 330 is not valid, then the daemon process 350 may post an error to the client computer 110 and/or the user. If the element handle 330 is valid, the daemon process 350 continues with the request to store an object by transferring object data 340 to the selected object server 130.

In block 530, if the request is to store to memory, the child process of the object server 130 determines the size of the object from the object data 340 and allocates sufficient memory within the object server 130 to store the object. In block 540, if the request is to store to a file, then the child process stores directly to the file, without allocating memory.

Continuing with block 550, a copy of the object is generated and placed in the output queue of the client computer 110. Alternatively, as necessary, the user and/or the client computer 110 may make additional copies of the object before storing the object to the object server 130. For example, working and/or reference copies of the object may be generated.

In block 560, the object is then manipulated. As previously defined, an object is manipulated by transferring the object from the client computer 110 to the object server 130. When the selected object server 130 receives the object, the child process may direct the object to the allocated memory.

In an alternative embodiment, the object may be transferred to the object server 130, and after the object server 130 receives the object, the child process can determine the size of the object, allocate sufficient memory, and store the object to the allocated memory. After the object has been manipulated, the object server 130 receiving the object may update the directory of the contents of each object server 130 which is stored in the library server 120 to reflect the addition of an object.

6. Executing Request to Retrieve Object

Figure 6:
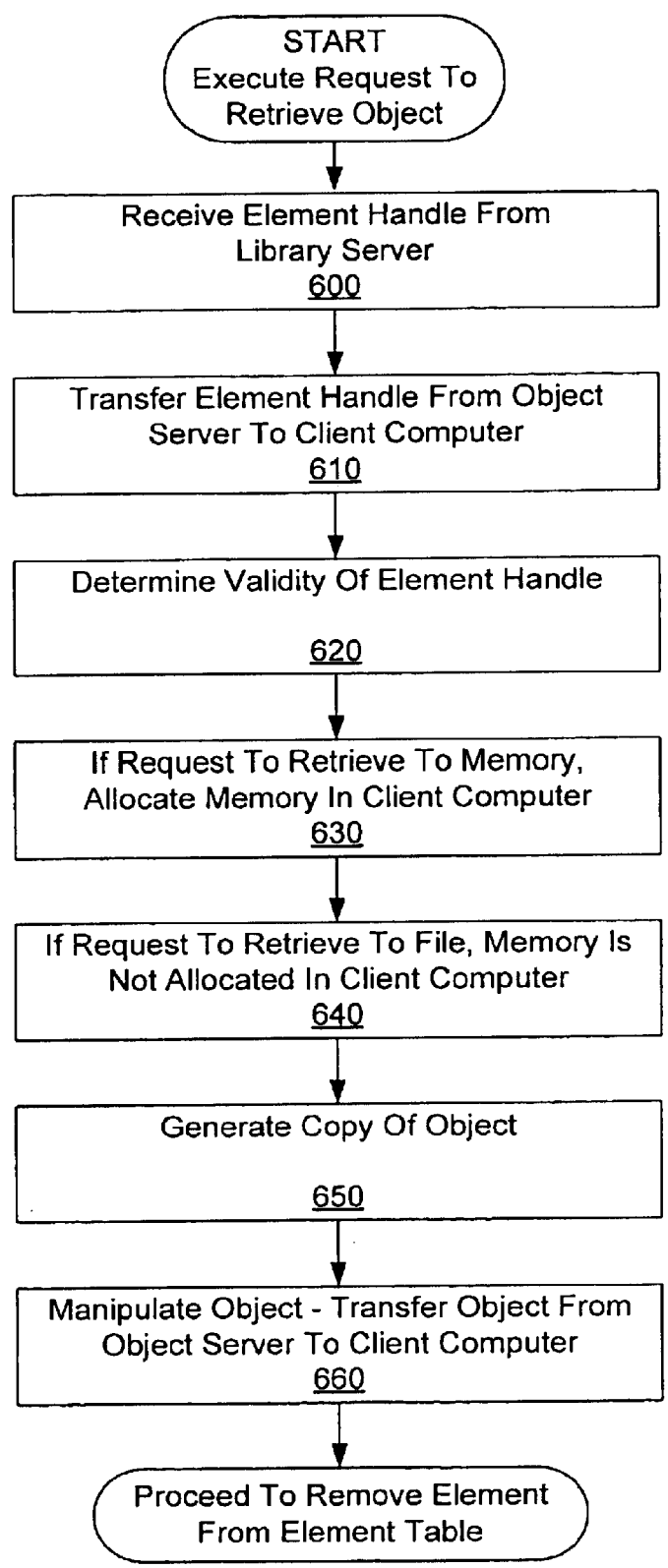
FIG. 6 is a flow diagram illustrating the steps performed by the object identification system to retrieve an object from an object server.

With reference to FIG. 6, a flow diagram illustrating how the object identification system 140 executes a request to retrieve an object, in block 600, an object server 130 receives an element handle 330 from the library server 120.

In one embodiment in a request to retrieve an object, in order to select an object server 130, the library server 120 scans the catalogue to determine which object server 130 stores the object. In particular, the catalogue specifies the content of each object server 130. If an object server 130 stores a requested object, the library server 120 selects that object server 130 and transfers the element handle 330 to the selected object server 130.

In an alternative embodiment, for a request to retrieve an object, the library server 120 scans the directory of the contents of each object server 130. The library server 120 determines which, if any, object server 1300 already stores the requested object. If an object server 130 stores a requested object, the library server 120 selects that object server 130 and transfers the element handle 330 to the selected object server 130. However, if the library server 120 can not locate the requested object in any object server 130, then the library server 120 may inform the client computer 110 and/or the user that the request can not be executed and the application will fail.

The following alternative embodiments illustrate various other techniques to ascertain the contents of each object server 130 to determine which object server 130 will be selected by the library server 120. In an alternative embodiment, the library server 120 may periodically scan each object server 130 and update the object server directory to reflect any changes. In yet another alternative embodiment, the user may update the object server directory stored on the library server 120 after the user's request to manipulate an object has been completed. It is apparent to one of ordinary skill in the art that numerous techniques may be implemented to provide the library server 120 with current data regarding which objects reside in particular object servers 130.

Continuing with block 610, the element handle 330 is then transferred from the selected object server 130 to the client computer 110.

In block 620, In block 520, the daemon process 350 determines the validity of the element handle 330 and whether the element handle 330 corresponds to the correct object. At this point, the object server 130 has established communications with the client computer 110 and identified itself to the client computer 110 as the object server 130 that will supply the object to the client computer 110. If the element handle 330 is not valid, the daemon process 350 may post an error to the client computer 110 and/or the user. If the element handle 330 is valid, the daemon process 350 continues with the request to retrieve an object by requesting that the object server 130 transfer the object size data to the client computer 110. If the request is to retrieve the object to memory, the object identification system 140 proceeds to block 630. Otherwise, the object identification system 140 proceeds to block 640.

In block 630, if the request is to retrieve to memory, the daemon process 350 of the client computer 110 determines the size of the object from the object size data and allocates sufficient memory 300 within the client computer 110 to store the object. In block 640, if the request is to store to a file, the daemon process 350 stores directly to the file in the file system 28, without allocating memory. The client computer 110 is then prepared to receive the object, and the object server 130 is prepared to transfer the object.

Continuing with block 650, the child process of the selected object server 130 generates a copy of the object. Then in block 660, the copy is placed in the output queue of the object server 130 and manipulated. In a request to retrieve an object, an object is manipulated by transferring the requested object from the selected object server 130 to the client computer 100. When the object is received by the client computer 110, the object is stored in the allocated memory or a file. The user may then access the object and copy, modify, transfer, and/or utilize the object as necessary. In an alternative embodiment, a single object server 130 may be coupled directly to a user operating on a separate workstation, and the object server 130 may transfer the object directly to the user rather than directing the object through the client computer 110.

After the object has been manipulated, the object server 130 receiving the object may update the directory of the contents of each object server 130, if necessary (which is stored in the library server 120), to reflect that an object was added, deleted, or updated at the object server 130. For example, if a thread requires a copy of an object, the contents of the object server 130 do not change since the original object remains stored in the object server 130. If the object is updated/deleted in the object server 130, then content of the object server 130 has changed and the directory of the contents of each object server 130 stored in the library server 120 must be updated.

6.C. Updating Library Server After Manipulating Object

After an object has been manipulated, the directory of object servers 130 maintained by the library server 120 may need to be updated to reflect the addition, deletion, or any other change of an object from an object server 130. More specifically, the object server 130 involved in manipulating an object updates the directory corresponding to that object server 130 to indicate that a new object has been added, deleted, or otherwise changed. Alternatively, the library server 120 may periodically scan the contents of each object server 130 and update the directory to reflect any changes within the object servers 130. In yet another alternative embodiment, the user may update the library server 120 directory. For example, the user may confirm that the object was successfully stored in the object server 130 by retrieving the object and update the library server 120 if the user knows the memory address within the object server 130 corresponding to that object.

Furthermore, after an object has been manipulated and the library server 120 has been updated, if necessary, the element 310, element handle 330, and related object data 340 may be removed from the element table 320.

7. Deleting, Element Handle from Element Table

Figure 7:
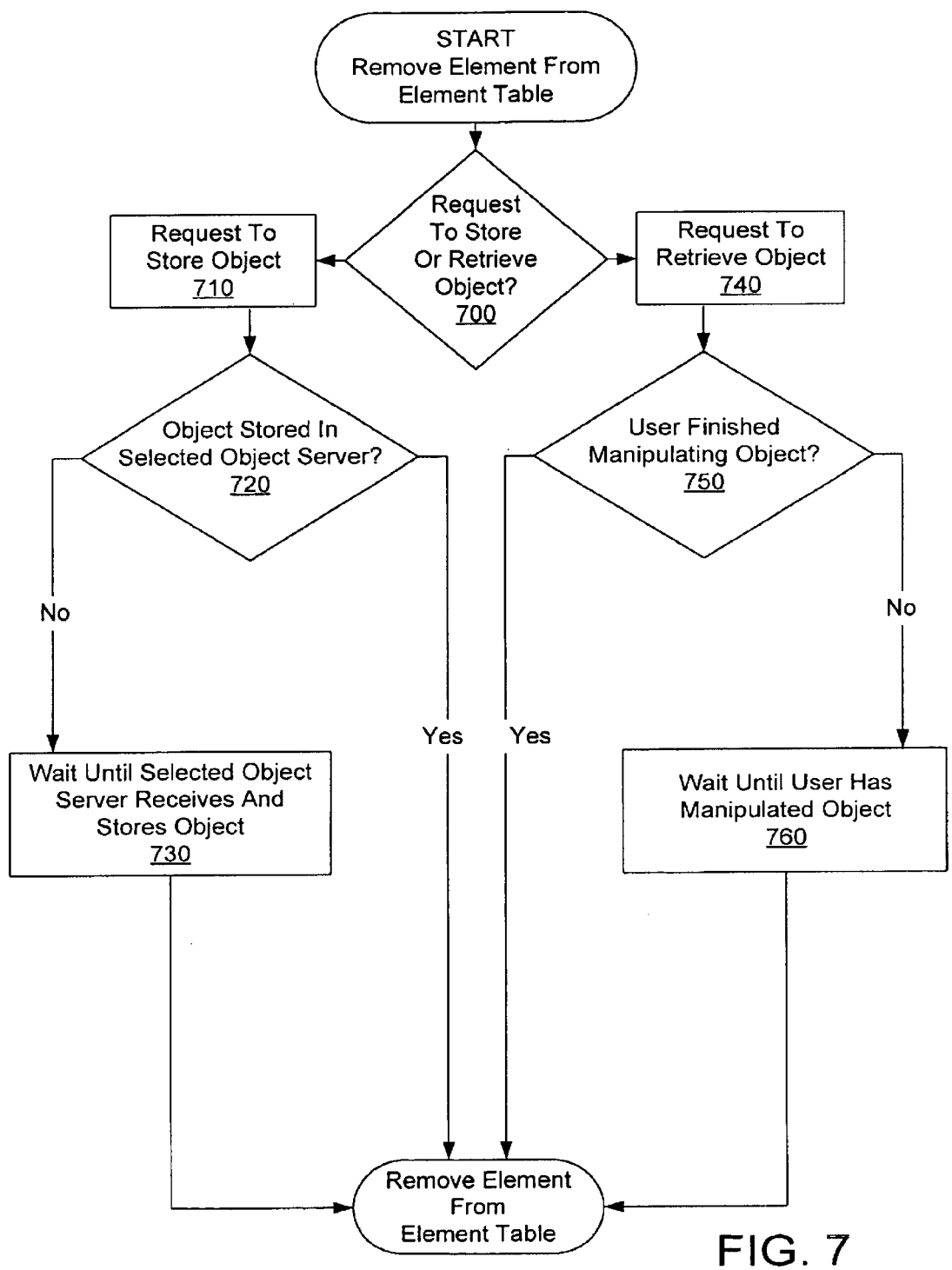
FIG. 7 is a flow diagram illustrating the steps performed by the object identification system to remove an element, element handle, and related object data from an element table.

Continuing with FIG. 2, in block 270, after the object is manipulated, the object identification system 140 may remove an element 310 from the element table 320 to free memory 300 for other elements generated by new requests. However, with reference to FIG. 7, a flow diagram illustrating when an element 310 is removed restore and to retrieve an object, the time when elements 310 may be removed depends on the request as shown in block 700. If the request is to store an object, the object identification system 140 proceeds to block 710. Otherwise, the object identification system 140 proceeds to block 740.

7.A. Deleting Element Handle After Storing Object

In block 710, the user request is to store an object. In this case, whether the element 310 may be removed from the element table 320 depends on whether the object has actually been stored in the selected object server 130 as shown in block 720. If the object is stored in the correct object server 130, then the element 310 may be deleted from the element table 320. However, in block 730, if the object has not been stored in the selected object server 130, or was stored in the incorrect object server 130, then the user and/or client computer 300 must wait until the object is stored in the selected object server 130. Then, the element 310 may be deleted from the element table 320.

7.B. Deleting Element Handle After Retrieving Object

In block 740, the user request is to retrieve an object. In this case, as shown in block 750, whether the element 310 may be deleted after a request to retrieve an object depends on whether the user and/or client computer 110 has finished manipulating the object. In block 750 if the object has been manipulated, then the element 310 may be removed from the element table 320. However, in block 760, if the object is still being manipulated by the process thread or will be manipulated by a thread in the future, then the element 310 can not be deleted until the manipulation has been completed. After the process thread has executed and the object is no longer needed by the thread, the element 310 may be deleted from the element table 320.

Asynchronous Object Retrieval in Multimedia Library

Another embodiment of the present invention provides an object access system 150. The object access system 150 allows users to access objects while they are being transferred and releases processes that were allocated to the object transfer after the transfer has been initiated such that those processes may be utilized for other tasks.

Figure 8:
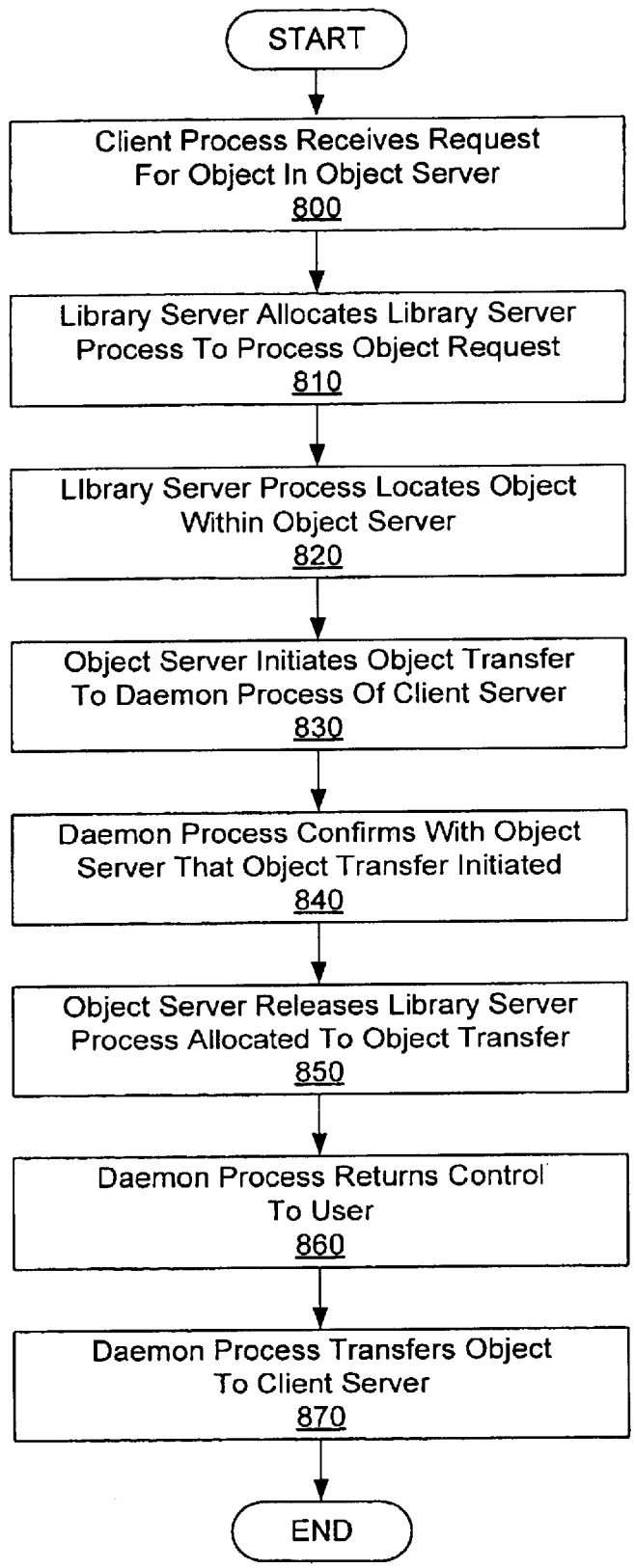
FIG. 8 is a flow diagram illustrating the technique used by the object access system.

FIG. 8, a flow diagram illustrating the technique of the object access system 150, generally illustrates how requests to retrieve objects are processed asynchronously and how those requests are processed among a client computer 110, library server 120, data stores or object servers 130. The object access system 150 utilizes a client computer 110 configuration similar to that illustrated in FIGS. 1(A–C) and 3. The client server 110 includes a daemon process 360 that operates in the background to facilitate access and retrieval of objects from an object server. The daemon process 360 manages or "catches" the requests submitted by the user and acts as an interface among the client computer 110, library server 120, and object server 130.

Initially, in block 800, the object access system 150 receives a request from a client process at a client server 110 to access or retrieve an object stored in an object server 130. In block 810, the object access system 150 allocates a library server process to process the object request. Then, in block 820, the object access system 150 locates the requested object within an object server 130. In block 830, the object access system 150 initiates the transfer of the requested object from the object server 130 under control of the library server process to the daemon process 360. Then, in block 840, the object access system 150 notifies the selected object server 130 that the object transfer has been initiated. In block 850, the object access system 150 releases the library server process that was allocated to handle the object request. The object access system 150 then transfers control to the user in block 860. Finally, in block 870, the object access system 150 transfers the object from the daemon process 360 to the client server 110. Following is a more detailed description of the present invention. For clarity, the following description refers to the actual computer, server or process (e.g., library server 120 or daemon process 360) as performing a task even though the same tasks may be considered to be performed by the object access system 150.

Initially, in block 800, with reference to FIGS. 1(A–C), a user submits a request for an object at a client computer 110 which is handled by a client process of client computer 110. The request may be submitted through, for example, an Application Program Interface set or "API" set associated with or residing in client computer 110. An API is a set of routines and protocols for building software applications. In other words, an API enables programs to be developed more easily by providing an interface through which components of the program can be utilized. Those skilled in the art will recognize that objects may be requested through various user interfaces. The request is then transferred from a client computer 110 to the library server 120.

In block 810, the library server 120 allocates a library server process, such as a child process, to process the object request. A library server process such as a child process executes commands or programs relating to the library server 120 such as locating an object server 130 and authorizing the transfer of an object from an object server 130 to a client server 110. The request for an object is sent from the client server 110 to the library sever 120 through, for example, a communications isolator or some other communications link or system. The request is then sent from the library server 120 to an object server 130 through the communications isolator.

In block 820, the allocated library server process locates the requested object within an object server 130 through, for example, a directory stored in the library server 120. Continuing with block 830, the object server 130 selected by the library server process initiates the transfer of the requested object from the object server 130 under control of the library server process to a daemon process 360 of client server 110. After transferring the object to the daemon process 360, in turn, the daemon process 360 transfers the object to the client server 110.

In block 840, after the transfer of the requested object has been initiated, the daemon process 360 confirms with the object server 130 that the object transfer has begun. The following is provided as an example structure that is sent by the daemon process 360 to object server 130 to acknowledge that the daemon process 360 has started receiving the object from the object server 130 (ie., object transfer has begun):

```
typedef struct {
    ISOMSGHDR              IsoMessageHeader;
    LS_GENERIC_HEADER      lsHeader;
    rsStoreID              achBlobServer;
    rsSubStoreID           achBlobSubstore;
    ULONG                  ulRowsAffected;
    LONG                   lCacheCode;
    LONG                   lBlobCode;
    LONG                   lAccessMethodCode;
    LONG                   lAccessMethodFailureCode;
    LONG                   lTargetBlobCode;
    LONG                   lTargetAccessMethodCode;
    LONG                   lTargetAccessMethodFailureCode;
    LONG                   lLibraryServerCode;
    LONG                   lSQLCode;
```

-continued

```
SHORT                sSQLNumber;
clock_t              ulTimeClientFromBlob;
clock_t              ulTimeClientToBlob;
ULONG                ulImageLength;
} DMN_STORE_RETRIEVE_CO;
```

In the above structure, the field achBlobServer stores an object server name. The fields 1CacheCode, 1BlobCode, 1AccessMethodCode, 1AccessMethodFailureCode, 1TargetBlobCode, 1TargetAccessMethodCode, 1TargetAccessMethodFailureCode, 1LibraryServerCode, 1SQLCode, sSQLNumber store return codes (e.g., zero may indicate success, while other values indicate errors). The field ulTimeClientFromBlob stores a time at which the daemon process 360 gets an indication that retrieval has been initiated. The field ulTimeClientToBlob stores a current time when the daemon process 360 is replying back to the object server 130. The field ulImageLength stores the length of the object being transferred.

The daemon process 360 may confirm with the object server 130 that the object transfer has begun at various times. For example, in one embodiment of the invention, the daemon process 360 sends the confirmation to the object server 130 immediately after the transfer is initiated. In an alternative embodiment of the present invention, the daemon process 360 confirms with the object server 130 that object transfer has been initiated at any time during the transfer of the requested object. Those skilled in the art will recognize that the daemon process 360 may send the confirmation to the object server 130 any time after the transfer has been initiated.

In block 850, the object server 130 releases the library server process from the object transfer, and control of the library server process is returned to the library server 120. The following is provided as an example structure that is sent from the object server 130 to the library server 120 to release a library server ("child") process that is handling the retrieve order:

```
typedef PACKED struct {
    RS_GENERIC_HEADER        rsHeader;
    RS_GENERIC_RESPONSE      rsResponse;
    rsItemID                 achitem;
    rsRepType                achversion;
    rsPartNum                ulpart;
    rsSemType                sSemType;
    rsItemID                 achfolderid;
    rsPatronID               achownerid;
    rsBoolean                bcache_current;
    rsTimeStamp              achreferenced;
    rsTimeStamp              achchanged;
    rsTimeStamp              achoptimistic;
    rsTimeStamp              achcreated;
    rsDays                   ulexpires;
    rsSecCode                bseclabel;
    rsStoreHint              achstorehint;
    rsLength                 ullength;
    rsOsID                   achOS_identifier;
    rsLocCode                blocation_kind;
    VCHAR                    vcext_type;
    VCHAR                    vcprovenance;
    VCHAR                    vclabel;
    VCHAR                    vclocation;
} RETRIEVE_RESPONSE;
```

As a result, the library server process that was previously allocated to the object transfer is no longer bound to that object transfer task. Thus, in contrast to conventional systems, the library server process may be allocated to other tasks while the requested object is being transferred to the daemon process 360 and client server 110. In other words, requests for objects are executed asynchronously or independently of when other object transfers have completed. This enhancement is beneficial since the library server process may be utilized to process other requests, increase throughput, and enhance system performance.

Figure 3:
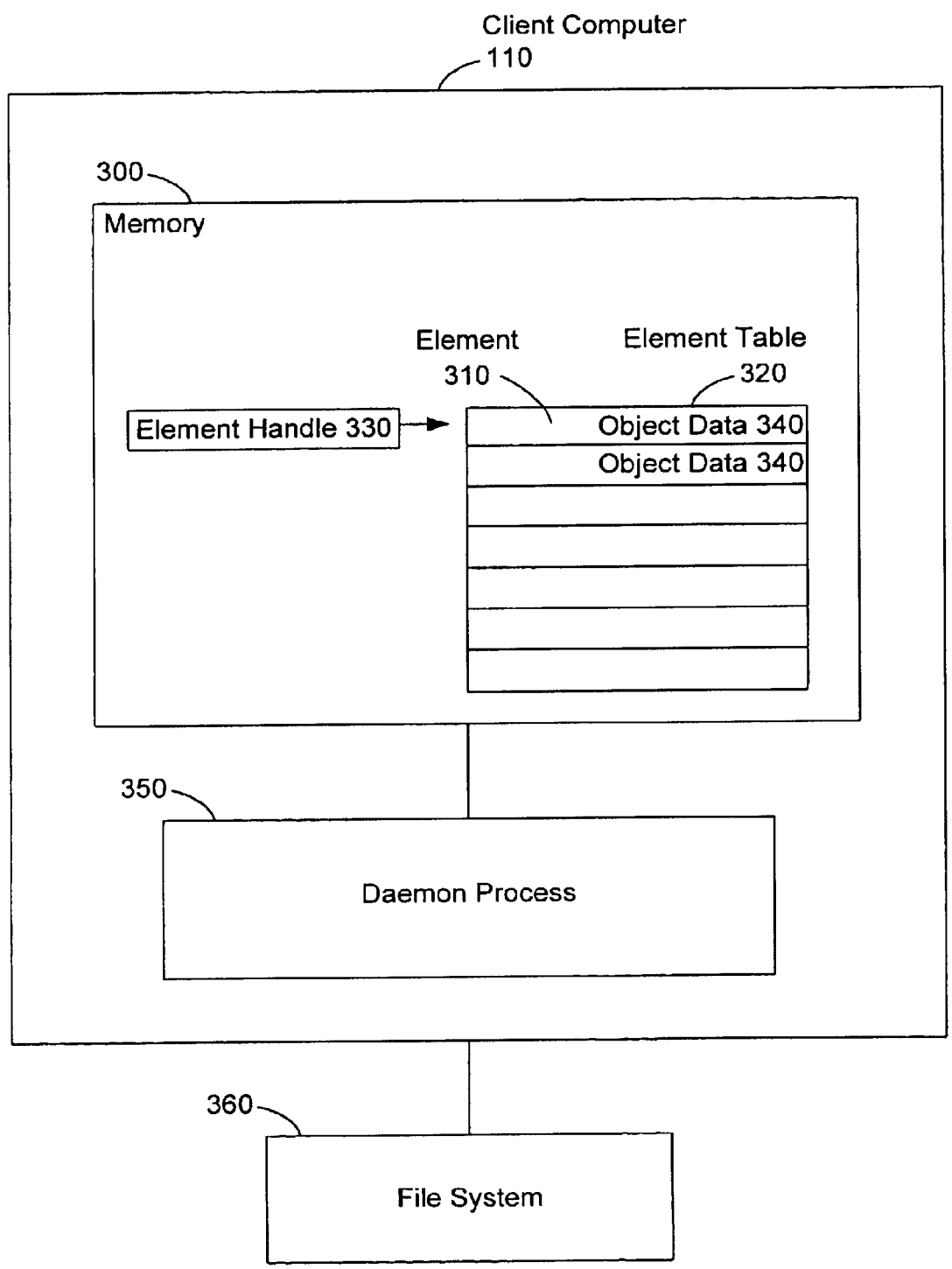
FIG. 3 is a flow diagram illustrating the technique used by the object identification system to manipulate (store or retrieve) one or more objects.

In block 860, after the library server 120 regains control of the library server process, the daemon process 360 may return control to the user via the client computer 110. A user may regain control at various times to perform various tasks. For example, in one embodiment of the present invention, the user can obtain control almost immediately after the transfer has been initiated. In other words, control may be returned to a user almost immediately after an object retrieval API has been called. In another embodiment of the present invention, the user may assume control at any time during the object transfer. In yet another alternative embodiment, the user can also choose to retrieve the entire object before the user regains control by using options known to those skilled in the art. For example, the user decide to invoke options of the fOpenControl parameter of the SimLibOpenObject API which may include SIM_OPEN_DISK or SIM_OPEN_MEMORY such that control is returned to the user after the entire object is retrieved. Thus, as illustrated in FIG. 3, the user may regain control before the object has been transferred from the daemon process 360 to the client computer 110. Alternatively, control may be returned to the user after the object transfer has been initiated.

The following is an example of the fOpenControl parameter of the SimLibOpenObject API for one embodiment of the invention:

BITS—input

Control option bits for opening the object. The following are valid values:

SIM_OPEN_DISK

Opens the object on disk. This value is the default; if this value is used, it will simultaneously increase application performance and decrease memory usage. This value will also use the pszFileLocation parameter. A user will not regain control until the whole object has been retrieved from the object server.

SIM_OPEN_MEMORY

Opens the object in memory. If this value is used, the system will not use the pszFileLocation parameter. The user will not regain control until the whole object has been retrieved from the object server.

SIM_OPEN_DISK_ASYNC

Opens the object on disk asynchronously. Once the object begins transferring from the object server, the user will regain control immediately. Exceptions: If the access level (ulAccessLevel) value equals SIM_ACCESS_READ_WRITE, this option will be treated the same as SIM_OPEN_DISK. Also, for MAXPIECE objects, SIM_OPEN_DISK_ASYNC will behave like SIM_OPEN_DISK.

SIM_OPEN_MEMORY_ASYNC

Opens the object in memory asynchronously. Once the object begins transferring from the object server, the user will regain control immediately. Exceptions: If the access level (ulAccessLevel) value equals SIM_ACCESS_READ_WRITE, this option will be treated the same as SIM_OPEN_MEMORY. Also, for MAXPIECE objects, SIM_OPEN_MEMORY_ASYNC will behave like SIM_OPEN_MEMORY.

After obtaining control, the user/client computer 110 may perform various tasks. The following examples are used only for illustrative purposes. In one embodiment of the present invention, the user may access, process or utilize any portion of the retrieved object as the object is being transferred from the client server 110 via the daemon process 360.

In another embodiment, the user may exercise control by identifying what portion of the requested object has been transferred, i.e., how many bytes of the object has been transferred. As a result, the user can determine how many remaining bytes must be transferred, and based on a transfer rate, how much additional time is required to complete the transfer.

For example, during asynchronous object retrieval, a user can find out how many bytes have been transferred to the user at any moment by calling the Ip2QueryObjectAccess( ) API and using ulCurrentObjSize and ulObjSize from an OBJACCINFOSTRUCT data structure. The following is an example Ip2QueryObjectAccess API function:

```
ULONG SIMENTRY Ip2QueryObjectAccess (
    HSESSION    hSESSION,    // handle to a session
                             // from SimLibLogon
    HOBJACC     hObjAcc,     // Object access handle
                             // from SimLibOpenObject call
    PRCSTRUCT   pRC);        // pointer to return structure
```

The above API will return a data structure OBJACCINFOSTRUCT with the pointer pRC->ulParam1. An example OBJACCINFOSTRUCT data structure is defined as follows:

```
// Object access information
typedef struct_OBJACCINFOSTRUCT {
    ULONG   ulStruct;        // Size of the structure
    ULONG   ulAccessLevel;   // SIM_ACCESS_SHARED_READ
                             // (0) or SIM_ACCESS_READ_
                             // WRITE (2)
    ULONG   ulOpenControl;   // SIM_OPEN_DISK (0) or
                             // SIM_OPEN_MEMORY (1)
    ULONG   ulObjSize;       // Object size
    char    * pMemLoc;       // Object memory location
                             // if opened to memory
    BOOL    bUserHasFile;    // Flag indicating user
                             // called GetObjectFileName
    OBJ     Obj;             // Object data structure
    char    szFileName       // File path and name if
            [257];           // opened to disk
    char    szReserved [3];  // Not used
    ULONG   ulCurrentObjSize; // Current retrieved size
                             // so far for async retrieval
} OBJACCINFOSTRUCT, *POBJACCINFOSTRUCT;
```

From the above structure, ulObjSize is the total size of the object, and ulCurrentObjSize is the current size that has been retrieved. Callers of the Ip2QueryObjectAccess API can call this API multiple times, if once is not enough, until the ulCurrentObjSize reaches the application's desired size. If the ulCurrentObjSize equals ulObjSize in the OBJACCINFOSTRUCT data structure, the retrieval has completed.

Further, in yet an additional alternative embodiment of the present invention, the user or client 110 may choose to abort the transfer of the requested object before the whole object has been transferred. For example, the object transfer may be aborted through the Library Client API LibFreeItemPart (pSession, IS_TRUE, hBlob), where pSession is the Library Client logon session handle, and hBlob is the element handle of the object being retrieved. The LibFreeItemPart( ) function is used to free a handle to an object in the cache or a handle to a response block The following is an example of the LibFreeItemPart (Free an Item Part) API:

LibFreeItemPart (pSession, bReclaim, hElement)

The pSession parameter is the handle to a library client session and receives input of SESSION_P.

The bReclaim parameter receives input of TRUE_FALSE and is an indicator for whether the library server should reclaim the data storage in the cache or retain the storage for later retrieval. The valid values are: IS_TRUE to abandon the data and reclaims the space or IS_FALSE to keep the object in the cache, to be obtained later.

The hElement parameter has input of HELEMENT and is the handle to the object in the cache.

On successful completion, the function returns one of the following values:

RC_OK

LCERR_NULL_SESSION

LST_ERR_ELEM_NOT_FOUND

To use the LibFreeItemPart function, if the object is stored on disk, the user must close the disk file before using this function. Preferably, the application calls the function as soon as it finishes with the object. In some environments (e.g., For Microsoft Windows 95®, Microsoft Windows NT®, and IBM AIX® environments) cache is implemented in workstation memory, rather than hard disk. In some environments (e.g., an IBM OS/2® environment) users can select cache to be either memory (no cache client) or hard disk (cache client).

In an additional embodiment of the object access system 150, the user or client server 110 can decide whether the requested object will be retrieved to memory 300 or to a file 360. If the object is retrieved to memory 300, the object access system 150 allocates a memory pointer referring to the size of the final object length. In this case, as the object is retrieved from the object server 130 through the daemon process 360 to the client server 110, the allocated memory 300 may be filled without changing the size of the allotted block of memory 300.

Alternatively, the user or client server 110 may decide to retrieve the object to a file 360. In this case, the file 360 can be opened with the final size of the final object length, and the object can be stored to the file 360 without change the file size.

Those skilled in the art will recognize that the user and/or the client may perform various other tasks, and that the previous examples are provided only for illustrative purposes.

CONCLUSION

This concludes the description of embodiments of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of embodiments of the invention have been presented for the purposes of illustration and description. It is not intended to be exhaustive or to limit the invention to the precise forms disclosed. Many modifications and variations are possible in light of the above teaching. It is intended that the scope of the invention be limited not by this detailed description, but rather by the claims appended hereto.

What is claimed is:

1. A method of manipulating objects at a computer, the method comprising:
   receiving one or more requests to manipulate an object;
   for each request, generating a unique identifier for a copy of the object; and
   associating the unique identifier with each request and its copy of the object to distinguish copies of the object from each other and to distinguish a copy of the object from an original object, so that multiple tasks involving the object may be executed simultaneously or in parallel.

2. The method of claim 1, wherein the computer is connected to one or more data stores through an intermediate processing computer.

3. The method of clam 2, wherein the intermediate processing computer selects one of the data stores.

4. The method of claim 2, wherein the intermediate processing computer is updated to reflect changes within the data stores.

5. The method of claim 1, wherein one of the requests to manipulate comprises a request to store the object into a data store.

6. The method of claim 5, wherein the computer is connected via a network to a library server and to one or more object servers and further comprising:
   transmitting the request from the computer to the library server, wherein the request includes the unique identifier;
   at the library server,
      selecting an object server; and
      transmitting the request to the object server, wherein the request includes the unique identifier; and
   at the object serer, communicating with the computer to receive the object to be stored, using the unique identifier to identify the object.

7. The method of claim 1, wherein one of the requests to manipulates comprises a request to retrieve the object from a data store.

8. The method of claim 7, wherein the computer is connected via a network to a library server and to one or more object servers and further comprising:
   transmitting the request from the computer to the library server, wherein the request includes the unique identifier;
   at the library server,
      selecting an object server; and
      transmitting the request to the object server, wherein the request includes the unique identifier; and
   at the object server communicating with the computer to transmit the object to be retrieved, using the unique identifier to identify the object.

9. The method of claim 1, wherein a different copy of the object exists for each of the requests.

10. The method of claim 1, wherein a first copy of the object is distinguished from a second copy of the object.

11. The method of claim 1, wherein a first copy of the object is distinguished from a second copy of the object.

12. The method of claim 1, wherein more than one request simultaneously manipulates a same object.

13. The method of claim 1, wherein the unique identifier further comprises a pointer referring to a set of object data.

14. The method of claim 13, wherein thee set of object data comprises a location of the object.

15. The method of claim 13, wherein the set of object data comprises an identification of the object.

16. The method of claim 15, wherein the identification comprises an item number and a part number.

17. The method of claim 16, whet the identification further comprises a rep type.

18. The method of claim 13, wherein the set of object data comprises a size of the object.

19. The method of claim 1, wherein the unique identifier comprises a memory address.

20. An apparatus for manipulating objects comprising:
   a computer; and
   one or more computer pr performed by the computer, for receiving one or more requests to manipulate an object, for each request, generating a unique identifier for a copy of the object, and associating the unique identifier with each request and its copy of the object to distinguish copies of the object from each other and to distinguish a copy of the object from an original object, so that multiple tasks involving the object may be executed simultaneously or in parallel.

21. The apparatus of claim 20, wherein the computer is connected to one or more data stores through an intermediate processing computer.

22. The apparatus of claim 21, wherein the intermediate processing computer selects one of the data stores.

23. The apparatus of claim 21, whets the intermediate processing computer is updated to reflect change within the data stores.

24. The apparatus of claim 20, wherein one of the requests to manipulate comprises a request to store the object into a data store.

25. The apparatus of claim 24, wherein the computer is connected via a network to a library server and to one or more object servers and further comprising:
   transmitting the request from the computer to the library server, wherein the request includes the unique identifier;
   at the library server,
      selecting an object server; and
      transmitting the request to the object server, wherein the request includes the unique identifier; and
   at the object server, communicating with the computer to receive the object to be stored, using the unique identifier to identify the object.

26. The apparatus of claim 20, wherein one of the requests to manipulate comprises a request to retrieve data from a data store.

27. The apparatus of claim 26, wherein the computer is connected via a network to a library server and to one or more object servers and further comprising:
   transmitting the request from the computer to the library server, wherein the request includes the unique identifier;
   at the library server,
   selecting an object server; and
   transmitting the request to the object server, wherein the request includes the unique identifier; and
   at the object seer, communicating with the computer to transmit the object to be removed, using the unique identifier to identify the object.

28. The apparatus of chim 20, wherein a different copy of the object exists for each of the requests.

29. The apparatus of claim 20, wherein a fist copy of the object is distinguished from a second copy of the object.

30. The apparatus of claim 20, wherein a first copy of the object is distinguished from the original object.

31. The apparatus of claim 20, wherein more than one request wants to simultaneously manipulate a same object.

32. The apparatus of claim 20, wherein the unique identifier further comprises a pointer referring to the set of object data.

33. The apparatus of claim 32, wherein the set of object data comprises a location of the object.

34. The apparatus of claim 32, wherein the set of object data comprises an identification of the object.

35. The apparatus of claim 34, wherein the identifier comprises an item number and a part number.

36. The apparatus of claim 35, wherein the identification further comprises a rep type.

37. The apparatus of claim 32, wherein the set of object data comprises a size of the object.

38. The apparatus of claim 20, wherein the unique identifier comprises a memory address.

39. An article of manufacture comprising a program storage medium readable by a computer and embodying one or more instructions executable by the computer to perform method steps for manipulating objects at a computes, the method comprising:
  receiving one or more requests to manipulate an object;
  for each request, generating a unique identifier for a copy of the object; and
  associating the unique identifier with each request and its copy of the object to distinguish copies of the object from each other and to distinguish a copy of the object from an original object, so that multiple tasks involving the object may be executed simultaneously or in parallel.

40. The article of manufacture of claim 38, wherein the computes is connected to one or more data stores through an intermediate processing computer.

41. The article of manufacture of claim 40, where the intermediate processing computer selects one of the data stores.

42. The article of manufacture of claim 40, wherein the intermediate processing computer is updated to reflect changes within the data stores.

43. The article of manufacture of claim 38, wherein the request to manipulate comprises a request to store the object into a data store.

44. The article of manufacture of claim 42, wherein the computer is connected via a network to a library server and to one or more object servers and further comprising:
  transmitting the request from the computer to the library server, wherein the request includes the unique identifier;
  at the library server,
    selecting an object server; and
    transmitting the request to the object server, wherein the request includes the unique identifier; and
  at the object server, communicating with the computer to receive the object to be stored, using the unique identifier to identify the object.

45. The article of manufacture of claim 39, wherein the request to manipulate comprises a request to retrieve the object from a data store.

46. The article of manufacture of claim 45, wherein the computer in connected via a network to a library server and to one or more object servers and further comprising:
  transmitting the request from the computer to the library server, wherein the request includes the unique identifier;
  at the library server,
    selecting an object server; and
    transmitting the request to the object server, wherein the request includes the unique identifier; and
  at the object sewer, communicating with the computer to transmit the object to be retrieved, using the unique identifier to identify the object.

47. The article of manufacture of claim 39, wherein a different copy of the object exists for each of the requests.

48. The article of manufacture of claim 39, wherein a first copy of the object is distinguished from a second copy of the object.

49. The article of manufacture of claim 39, wherein a first copy of an object is distinguished from the original object.

50. The article of manufacture of claim 39, wherein more than one request wants to simultaneously manipulate a same object.

51. The article of manufacture of claim 39, wherein the unique identifier further comprises a pointer referring to a set of object data.

52. The article of manufacture of claim 51, wherein the set of object data comprises a location of the object.

53. The article of manufacture of claim 51, wherein the set of object data comprises an identification of the object.

54. The article of manufacture of claim 53, wherein the identification comprises an item number and a part number.

55. The article of manufacture of claim 54, wherein the identification further comprises a rep type.

56. The article of manufacture of claim 51, wherein the set of object data comprises a size of the object.

57. The article of manufacture of claim 39 wherein the unique identifier comprises a memory address.

* * * * *

UNITED STATES PATENT AND TRADEMARK OFFICE
CERTIFICATE OF CORRECTION

PATENT NO. : 6,871,203 B1
DATED : March 22, 2005
INVENTOR(S) : Donald Edward Benson et al.

It is certified that error appears in the above-identified patent and that said Letters Patent is hereby corrected as shown below:

Column 21,
Line 21, "clam" should read -- claim --.
Line 39, "serer" should read -- server --.
Line 43, "manipulates" should read -- manipulate --.
Line 63, "a second copy of the object" should read -- the original object --.

Column 22,
Line 7, "whet" should read -- wherein --.
Line 15, "pr" should read -- programs --.
Line 29, "whets" should read -- wherein --.
Line 30, "change" should read -- changes --.
Line 63, "seer" should read -- server --.
Line 64, "removed" should read -- retrieved --.
Line 66, "chim" should read -- claim --.

Column 23,
Line 1, "fist" should read -- first --.
Line 14, "identifier" should read -- identification --.
Lines 25 and 37, "computes" should read -- computer --.
Line 45, "38" should read -- 39 --.
Line 48, "42" should read -- 43 --.

Column 24,
Line 12, "in" should read -- is --.
Line 23, "sewer" should read -- server --.

Signed and Sealed this

Sixth Day of September, 2005

JON W. DUDAS
*Director of the United States Patent and Trademark Office*